Patented Aug. 15, 1933

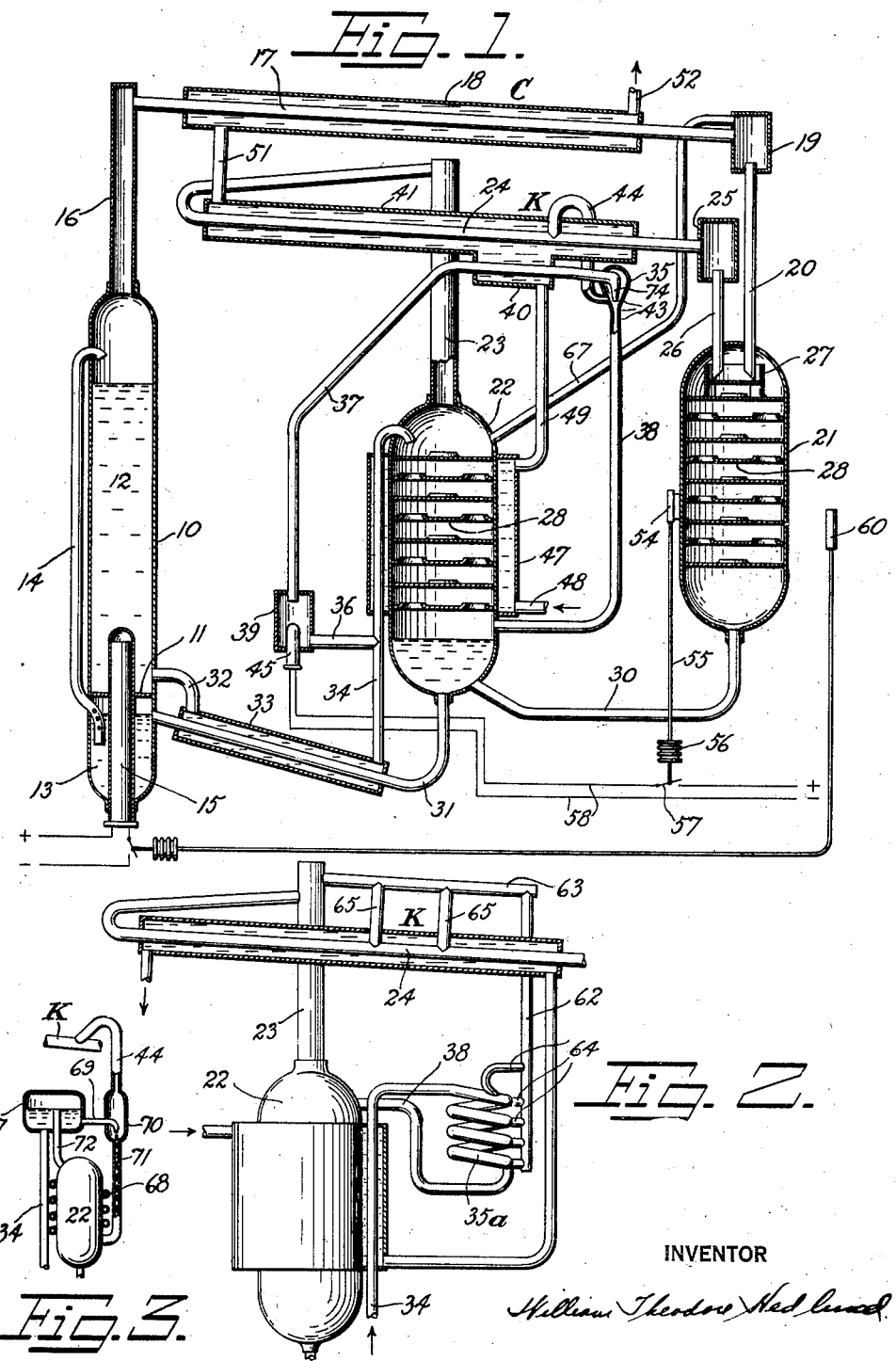

1,922,203

UNITED STATES PATENT OFFICE 1,922,203

REFRIGERATION

William Theodore Hedlund, Mount Vernon, N. Y., assignor to Electrolux Servel Corporation, New York, N. Y., a Corporation of Delaware Application April 13, 1928. Serial No. 269,835

22 Claims. (Cl. 62—119.5)

My invention relates to refrigeration and more particularly to refrigeration involving absorption of gas by a liquid.

The purpose of the invention is to remove non-condensable gas from a condenser or other part of a refrigeration system. It is a further purpose of the invention to remove the non-condensable gas automatically and dispose of the same within the system of apparatus. It is still a further purpose to remove the gas by passing absorption liquid into contact with such gas and drawing it away from the condenser. The withdrawal of the non-condensable gas may be continuous or intermittent.

The invention will be explained more in detail with reference to the accompanying drawing on which:

Fig. 1 shows diagrammatically a binary liquid evaporation system with the invention applied thereto, the system employing a separate circulation cycle for removing gas;

Fig. 2 is a modification of the arrangement shown in Fig. 1 constituting a second embodiment of the invention wherein the main absorption liquid cycle is used to remove gas; and Fig. 3 shows a third embodiment wherein a drip arrangement is used.

In Fig. 1, reference character 10 designates a generator shell divided by a partition 11 into a main generator 12 and a first auxiliary generator 13. The auxiliary generator 13 is situated below the main generator and a riser pipe 14 extends within auxiliary generator 13 and opens into main generator 12 for lifting liquid from the auxiliary generator 13 to the main generator 12.

Main generator 12 contains a cooling agent which is preferably ammonia dissolved in an absorption liquid, which is preferably distilled water. Heat applied to main generator 12 by means of heating cartridge 15 causes ammonia to be expelled from solution and change from liquid to gaseous form. The vapor of ammonia thus generated passes upwardly through conduit 16 and into condenser conduit 17. The condenser is diagrammatically illustrated and indicated by reference character C. This is the first or ammonia condenser. The condenser may be cooled either by air or by water. A water cooling jacket 18 is illustrated. The condenser discharges into a receptacle 19. A vertical pipe 20 extends from receptacle 19 downwardly into evaporator 21. A rectifier may be interposed between the generator and the condenser for removing water vapor entrained with the ammonia vapor.

Reference character 22 designates what I term the main absorber. Extending upwardly from the top of the main absorber is a conduit 23 which conveys vapor of an auxiliary agent to condenser pipe 24. This pipe is a part of the second condenser designated generally by reference character K. The auxiliary agent is preferably propane. Liquid propane passes from propane condenser K to receptacle 25 and thence through vertically extending conduit 26 into the evaporator.

The evaporator and absorber are equipped with disks 28 for distributing liquid and for obtaining a large surface of gas and liquid contact.

The two liquids pass downwardly through conduits 20 and 26 and mix in the evaporator. This may be accomplished in a number of ways. In the case illustrated, these two vertical conduits 20 and 26 open into a cup 27, from which the liquids overflow onto the disks within the evaporator.

The evaporator is in heat exchange relation with the objective of refrigeration. Inside the evaporator the liquids diffuse into each other and form a gas mixture. The gas mixture passes through conduit 30 which is connected to the bottom of the evaporator and the gas mixture bubbles up through liquid in the bottom part of the absorber. The pressure in the evaporator is higher than in the absorber by an amount which has a relation to the height of liquid in the absorber through which the gas mixture bubbles. Liquid columns stand in conduits 20 and 26 and take up the pressure gradient between the condensers and the evaporator.

Absorption liquid is circulated between the main generator and the absorber by thermosiphon action. Aqueous ammonia passes from the bottom of the absorber through conduit 31 into auxiliary generator 13. The level in the absorber is higher than in the auxiliary generator. In the auxiliary generator, vapor is produced which passes into riser pipe 14 and entrains liquid and lifts the same to the higher level in the main generator. Weak absorption liquid passes through conduits 32, 33 and 34 to the upper part of the absorber. Thus the strong absorption liquid is percolated from the bottom part of the absorber to so high a level in the generator that weak absorption liquid can flow from the generator by gravity into the top of the absorber.

Complete separation of gases is impossible. Consequently some ammonia is carried along with propane vapor through conduit 23 and enters condenser pipe 24. The partial pressure of this ammonia is very low and consequently, the cooling agent of the second condenser being of higher temperature than the temperature of the evaporator, this ammonia will not readily condense. It will be understood that the condensers as shown are diagrammatic and that any type of condenser is intended to be illustrated. The more irregular the design of the condenser or the more adept the condenser is to pocket gas, the more applicable is the present invention. The present invention consists principally in removing the ammonia gas from the propane condenser and preferably doing this by drawing the ammonia gas into a second absorber 35. A second thermo-siphon circulation system includes conduits 36, 37 and 38. Conduit 36 is connected to conduit 34 and is connected to a second auxiliary generator 39. For purposes of percolating, the second auxiliary generator has the benefit of liquid in conduit 34 above conduit 36 as a reaction. Conduit 37 extends within auxiliary generator 39 and extends upwardly above the absorber and through a cooling element 40 and thence conveys fluid to the secondary absorber. The cooling element 40 is shown as a water jacket formed as part of the cooling jacket 41 for the second condenser K.

The secondary absorber 35 comprises an ejector which serves to give velocity to liquid supplied thereto by the thermo-siphon action of the second auxiliary generator 39. The ejector, which is indicated at 43, is arranged so that the absorption liquid passing out of the end of the ejector nozzle 74 is directed downwardly into conduit 38. The ejector may be of various types and is diagrammatically illustrated. The ejector has a narrow portion where increase of velocity pressure gives reciprocal decrease of static pressure and this causes a suction through the conduit 44 which is connected to the second condenser K. Conduit 38 is connected to the lower part of the absorber. Both suction and absorption operate in absorber 35 to draw gas through conduit 44.

Heat applied to second auxiliary generator 39 by means of heating cartridge 45 causes a lifting of weak absorption liquid through conduit 37 which passes through the ejector of the secondary absorber and draws ammonia gas out of the propane condenser, absorbs the ammonia gas and carries it to the main absorber.

While I prefer to absorb the withdrawn gas, it will be evident that it is possible to entrain the gas with liquid without involving absorption.

A water jacket 47 surrounds the absorber and cooling water is supplied through conduit 48, passes through jacket 47, through conduit 49, to cooling jacket 41 and through conduit 51 to cooling jacket 18 and out through conduit 52. Obviously, any arrangement of cooling means may be applied. The absorber may, for example, be entirely air-cooled.

The disadvantage of the accumulation of non-condensable gas in the propane condenser is the effect on the decrease of efficiency and stoppage of the entire apparatus. It is therefore practical to use the withdrawing means for the non-condensable gas only when the refrigerator stops functioning or its efficiency is very low. This will react in a rise of temperature in the evaporator or of the space or substance surrounding the evaporator. For this reason I provide a thermostatic bulb 54 which is in thermal relation to the evaporator. This bulb is connected to a tube 55 in turn connected to a mechanism diagrammatically indicated at 56 for applying heat to the second auxiliary generator 39 when the temperature of the evaporator rises above a given value. Member 56 may be a bellows operating an electric switch 57 controlling the electric circuit 58 of the heating cartridge 45. Obviously, this mechanism may control the gas supply in case the appartus is operated by gas.

If the current to the main heating cartridge 15 were normally controlled by a thermostat such as indicated at 60 which operates to keep the temperature of the space to be cooled within definite limits of temperature or approximately at a given temperature, the arrangement indicated by numerals 54, 55 and 56 would be a second agency of regulation which might or might not be interconnected with the primary regulator depending on choice and type of apparatus. In such case, assuming that the main thermostat 60 was responsive for action to temperatures of about 45°, the bulb 54 would react to close switch 57 at an appreciably higher temperature, for instance 70°.

In order to vent propane gas from ammonia condenser C, a vent conduit 67 is provided connecting the upper part of vessel 19 with the upper part of the absorber. It will be understood that the ejector action might be used to draw propane from the ammonia condenser. In the apparatus the simple vent pipe 67 serves the purpose as a slightly higher pressure exists in vessel 19 than in the absorber.

Conduit 44 may be connected to the upper part of vessel 25.

In Fig. 2, a modified form is shown wherein the weak absorption liquid passing through conduit 34 from the main generator is precooled in the water jacket for the main absorber as in Fig. 1 but passes through the secondary absorber 35a which in this case is of different form and thence into the main absorber through conduit 38. Weak absorption liquid is thus supplied to the secondary absorber and the main absorber in series in this case whereas it is supplied in parallel in the apparatus of Fig. 1, though in Fig. 1 the secondary absorber and the main absorber are also arranged in series by means of conduit 38. In Fig. 2, secondary absorber 35a is formed as a coil to which weak absorption liquid is supplied at the upper end and to the bottom of which conduit 38 is connected. The secondary absorber is connected to condenser K by means of vertically extending conduit 62 which is connected at its upper end to a conduit 63 in turn connected to conduit 23 and to several spaces of the condenser. This conduit is also connected by means of branches 64 to various points of the coil 35a. Were the condenser K to be a coil, the branches 65 connecting the condenser conduit 24 with conduit 63 would be connected to various loops of the coil. In this case, weak absorption liquid passing from the generator is gyrated in coil 35a and draws ammonia through conduits 65, 63, 62 and 64 to itself and absorbs it. In the modification of Fig. 2, an intermittent action is not possible unless the absorption liquid is intermittently circulated. With the type or liquid circulation between the main generator and main absorber as shown in Fig. 1 and with a regulative thermostat control, the absorption would tend to be continuous in Fig. 2. It will be noted that the fluids of the system are selected so that the fluid normally and primarily condensing in the second condenser is not absorbable by the absorption liquid, wherefore the action of the arrangement shown in Fig. 2 will be the same as without any secondary absorption in case there is no ammonia in the propane condenser.

In the embodiment shown of Fig. 3 a vessel 67 is arranged above the absorber which is supplied with absorption liquid from the generator through conduit 34 which is in heat exchange relation with the cooling water coil 68 for the absorber. The generator is appropriately arranged to permit flow of liquid therefrom to vessel 67 through the liquid heat exchanger and conduit 34. Connected to the lower part of vessel 67 is a conduit 69 of small cross-sectional area which opens into a vessel 70. Vessel 70 is restricted at the bottom and is connected with a capillary tube 71. The upper part of vessel 70 is connected by means of conduit 44 with condenser K or with such other receptacle as it is desired to relieve of accumulated gas. A conduit 72 connects vessel 67 at a relatively high level with the absorber and constitutes the main conduit for flow of absorption liquid into the absorber. The greater portion of absorption liquid flows through conduit 72. A small quantity of absorption liquid passing through conduit 69 issues as drops from the end thereof in member 70 and these drops fall into capillary conduit 71 and entrain gas between drops which are thus carried downwardly through conduit 71 to a lower part of the absorber. The liquid passing out of conduit 69 probably absorbs gas entrained.

The arrangement shown in Fig. 1 may operate on the pricniple of Fig. 3 by having a series of drops issue from the lower opening of the inner member 74 within member 35 and by making a suitably small restriction in conduit 38 at its connection to member 35 or by making conduit 38 a small capillary tube. The structure of Fig. 1 for such operation would be as shown with the conduits and openings thereof made of suitably small cross-section. With a considerable restriction of the opening of member 74 to provide the slow outflow above described as contrasted with the faster ejector flow it would be preferred to connect a high point of conduit 37 above the opening of member 74 with the absorber to provide an overflow of excess liquid percolated through the secondary absorption liquid circuit.

While I have shown several forms of the invention, it will be readily understood that the internal factors of the system may be utilized to remove the non-condensable gas from the second condenser or from the condenser of a system in other manners falling within the spirit and scope of the present invention.

Having thus described my invention, what I claim is:

1. Refrigerating apparatus comprising a generator, a condenser, an evaporator, an absorber, means for circulating absorption liquid between the generator and the absorber and means for circulating absorption liquid into contact with gas entrained in the condenser and thence to the absorber.

2. Refrigerating apparatus comprising a main absorber, an evaporator, a condenser, a secondary absorber, means to convey absorption liquid to each of the absorbers, means to conduct liquid from the secondary absorber to the main absorber, a gas connection between the condenser and the secondary absorber, and means to conduct liquid from the condenser to the evaporator.

3. Refrigerating apparatus comprising a generator, a condenser, a main absorber, a secondary absorber, means to conduct refrigerant from the generator to the condenser and from the condenser to the evaporator and from the evaporator to the main absorber, means to circulate absorption liquid between the generator and the main absorber, means to convey absorption liquid through the secondary absorber and means to conduct gas from the condenser to the secondary absorber.

4. Refrigerating apparatus comprising a generator, a condenser, an absorber, an evaporator, connections between the aforementioned parts for circulating a cooling agent, an auxiliary agent and absorption liquid and means to lift absorption liquid above the absorber to withdraw gas from the condenser.

5. Refrigerating apparatus comprising a generator, a condenser, an evaporator, an absorber, means connecting the aforementioned parts to form circuits of circulation including a first thermo-siphon circulation cycle for circulating absorption liquid between the generator and the absorber and a second thermo-siphon circulation cycle for removing non-condensable gas from the condenser.

6. Refrigerating apparatus comprising a generator, a plurality of condensers, an evaporator, an absorber, means for conducting vapor from the generator to one of the condensers, means for conducting vapor from the absorber to a second of said condensers, means to conduct liquid from each of the condensers to the evaporator, means to conduct gas from the evaporator to the absorber, a first thermo-siphon circulation cycle for circulating absorption liquid between the generator and the absorber and a second thermo-siphon circulation cycle for removing gas from said second condenser.

7. Refrigerating apparatus comprising a generator, a condenser, an evaporator, and an absorber forming a circuit for a cooling agent, a second circuit for an auxiliary agent comprising said evaporator, said absorber, and a second condenser through which the auxiliary agent passes from the absorber to the evaporator and absorption means for removing gaseous cooling agent from the second condenser.

8. Refrigerating apparatus comprising a generator, a condenser, an evaporator, and an absorber forming a circuit for a cooling agent, a second circuit for an auxiliary agent comprising said evaporator, said absorber and a second condenser through which the auxiliary agent passes from the absorber to the evaporator, a secondary absorber, a gas connection between said second condenser and said secondary absorber and means to circulate absorption liquid through the secondary absorber.

9. Refrigerating apparatus comprising a main generator, a first auxiliary generator, a second auxiliary generator, a main absorber, a secondary absorber, a first condenser, a second condenser, an evaporator, a conduit for conducting vapor of a cooling agent from said main generator to said first condenser, a conduit for conducting liquid cooling agent from said first condenser to said evaporator, a conduit for conducting vapor of an auxiliary agent from the main absorber to said second condenser, a conduit for conducting liquid auxiliary agent from said second condenser to said evaporator, a conduit for conducting a gaseous mixture of the cooling agent and the auxiliary agent from the evaporator to the main absorber, a conduit for conducting strong absorption liquid from the main absorber to said first auxiliary generator, a conduit for conveying vapor and liquid from said first auxiliary generator to said main generator, means for conducting weak absorption liquid from said main generator to said main absorber and said second auxiliary generator, means to convey vapor and liquid from said second auxiliary generator to said secondary absorber and cool the same before entry into said secondary absorber, means to conduct gaseous cooling agent from said second condenser to said secondary absorber and means to conduct liquid from said secondary absorber to said main absorber.

10. Apparatus in accordance with claim 9 comprising means for controlling supply of heat to the second auxiliary generator in response to temperature of the evaporator.

11. Absorption refrigerating apparatus comprising a plurality of condensers, means primarily operating to supply different gaseous substances to the different condensers and means within the apparatus and operating due to factors within the apparatus to remove from one condenser gas primarily designed to pass to a different condenser.

12. A hermetically sealed absorption refrigerating apparatus comprising a plurality of condensers, a source of a first gaseous fluid for one condenser, a source of a second gaseous fluid of different composition for a second condenser and means within the apparatus and operating due to factors within the apparatus for removing the first gaseous fluid from the second condenser and conducting it to another part of the apparatus.

13. A refrigerating apparatus comprising a member wherein pocketing of gas affects operation and automatic means for moving the pocketed gas to another part of the apparatus when the temperature of the evaporator rises above a predetermined value.

14. Refrigerating apparatus comprising a condenser, an evaporator, an absorber, a generator and liquid circulation means for entraining gas and thus withdrawing the gas from the condenser.

15. Refrigerating apparatus comprising means to expel a refrigerant from solution, means to convert the expelled refrigerant into liquid phase, means to evaporate the refrigerant, absorbing means, the aforesaid means being interconnected to form a system and said system including a plurality of absorption liquid circuits having independent circulating means, and independent means for automatically controlling flow of absorption liquid in the different circuits.

16. Refrigerating apparatus comprising means to expel a refrigerant from solution, means to convert the expelled refrigerant into liquid phase, means to evaporate the refrigerant, absorbing means, the aforesaid means being interconnected to form a system and said system including a plurality of absorption liquid circuits having independent circulating means, and independent temperature responsive means for automatically controlling flow of absorption liquid in the different circuits.

17. Refrigerating apparatus comprising means to expel a refrigerant from solution, means to convert the expelled refrigerant into liquid phase, means to evaporate the refrigerant, absorbing means, the aforesaid means being interconnected to form a system and means in said system for producing movement of gas comprising a nozzle ejector and means including a thermo-siphon member for forcing liquid through said ejector.

18. Refrigerating apparatus comprising means to expel a refrigerant from solution, means to convert the expelled refrigerant into liquid phase, means to evaporate the refrigerant, absorber means, the aforesaid means being interconnected to form a system, and means in said system for producing flow of gas comprising an ejector, vapor producing means for supplying motive fluid to the ejector, means for controlling the expulsion of refrigerant by the first mentioned means in response to variations in temperature of the objective of refrigeration and independent means for controlling the supply of fluid to the ejector in response to variations in temperature of the evaporating means.

19. Refrigerating apparatus comprising means to expel a refrigerant from solution, means to convert the expelled refrigerant into liquid phase, means to evaporate the refrigerant, absorbing means, the aforesaid means being interconnected to form a system, means for producing flow of gas into said absorbing means comprising an ejector and means responsive to different temperature ranges of the objective of refrigeration for controlling the expelling means, and the ejector.

20. Refrigerating apparatus comprising means to expel a refrigerant from solution, means to convert the expelled refrigerant into liquid phase, means to evaporate the refrigerant, absorbing means, the aforesaid means being interconnected to form a system, means for producing flow of gas into the said absorbing means comprising an ejector and vapor producing means for supplying motive fluid to the ejector, means responsive to normal temperature variations of the objective of refrigeration to control the expelling means and means responsive to high temperature of the evaporator for controlling said vapor producing means.

21. Refrigerating apparatus comprising means to expel a refrigerant from solution, means to convert the expelled refrigerant into liquid phase, means to evaporate the refrigerant, absorbing means, the aforesaid means being interconnected to form a system, and means for producing flow of gas into said absorbing means comprising an ejector and vapor producing means for supplying motive fluid to the ejector, and independent means responsive to different temperatures of the objective of refrigeration for automatically controlling the production of vapor in the first-mentioned means and said vapor producing means.

22. Refrigerating apparatus comprising a first heated vapor expeller, a second heated vapor expeller, a third heated vapor expeller, means for converting vapor expelled in said first expeller into liquid phase, an evaporator, an absorber, the aforesaid parts being interconnected to form a system, said system including means for circulating liquid between said absorber and said first expeller due to vapor produced in said second expeller, means for producing flow of gas comprising an ejector connected to said third expeller, means for heating the expeller and separate means responsive to different temperatures of the objective of refrigeration for controlling the supply of heat to the second and third expellers.

WILLIAM THEODORE HEDLUND.